United States Patent [19]
Chiu

[11] Patent Number: 6,113,729
[45] Date of Patent: *Sep. 5, 2000

[54] WAX SIZING AND RESIN BONDING OF A LIGNOCELLULOSIC COMPOSITE

[75] Inventor: Shui-Tung Chiu, Coquitlam, Canada

[73] Assignee: Borden Chemical, Inc., Columbus, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/131,950

[22] Filed: Aug. 10, 1998

[51] Int. Cl.$^7$ .................................. B27M 1/02; D21J 1/04
[52] U.S. Cl. ........................ 156/296; 156/283; 156/335; 156/62.2; 264/109; 264/122
[58] Field of Search ...................... 156/62.2, 296, 156/331.4, 335, 283; 264/109, 122

[56] References Cited

U.S. PATENT DOCUMENTS

| | | |
|---|---|---|
| 4,007,321 | 2/1977 | Scholz et al. . |
| 4,022,965 | 5/1977 | Goheen et al. . |
| 4,098,770 | 7/1978 | Berchem et al. . |
| 4,337,710 | 7/1982 | Haataja et al. . |
| 4,388,138 | 6/1983 | Brown et al. . |
| 4,393,019 | 7/1983 | Geimer . |
| 4,396,673 | 8/1983 | Ball et al. . |
| 4,409,293 | 10/1983 | Williams . |
| 4,424,300 | 1/1984 | Geimer . |
| 4,433,120 | 2/1984 | Chiu . |
| 4,761,184 | 8/1988 | Markessini . |
| 5,154,968 | 10/1992 | De Petris et al. . |
| 5,451,657 | 9/1995 | Chappelie . |

FOREIGN PATENT DOCUMENTS 58-063435A 1/1983 Japan .

OTHER PUBLICATIONS

E. Zavarin "Activation of Wood Surfaces and Non Conventional Bonding" The Chemistry of Solid Woods ACS Advances in Chemistry Series No. 207 (1984).
Bonding of Particleboard Using Hydrogen Peroxide, Ligno-sulfonates and Fufuryl Alcohol: Effects of Chemical Composition of Bonding Materials Forest Products Journal, vol. 32 (1982) Philippou, et al.
Bonding of Particleboard Using Hydrogen Peroxide, Ligno-sulfonates and Furfuryl Alcohol: the Effects of Process Parameters Forest Products Journal, vol. 32 (1982) Philippou, et al.
Philippou, et al. "Bonding Wood Graft Polymerization. The Effect of Hydrogen Peroxide Concentration on the Bonding Properties of Particleboard" Holzforschung vol. 36 (1982).
Phenolic Resins Chemistry, Applications and Performance (A. Knop and L.A. Plato) Springer–Verlag (1985).
Advanced Wood Adhesives Technology (A. Pizzi, Mercel Dekker 1994).
Vogel's Textbook of Quantitative Chemical Analysis, 5th Edition (1989) at pp. 394–395.
"Hydrogen Peroxide as a Resin Cure Accelerator" (K. Chapman and D. Jenkin), J. Adhesion, 1986 vol. 19, pp. 137–151.

*Primary Examiner*—Sam Chuan Yao
*Attorney, Agent, or Firm*—Kenneth P. Van Wyck; Michael M. Geoffrey

[57] ABSTRACT

There is provided a method for producing lignocellulosic composites. This method is useful in reducing the thickness swell of these composites on their exposure to water. This method also is useful in reducing the hot-press times required to make lignocellulosic composites. Furthermore, there is provided a method by which wax sizing may be used without the previously expected reduction in physical properties. Also, there is provided a method by which caul plate sticking may be reduced when hydrogen peroxide is used as a furnish add-on.

16 Claims, No Drawings

WAX SIZING AND RESIN BONDING OF A LIGNOCELLULOSIC COMPOSITE

FIELD OF THE INVENTION

This invention relates to improvements to the wax sizing and phenolic resin bonding of a lignocellulosic composite made by hot pressing. More particularly, this invention relates to the use of a hydrogen peroxide treatment to produce more dimensionally stable, lighter color, lignocellulosic composites than conventionally made composites. The use of the hydrogen peroxide treatment results in shorter press times than conventional processes. Further, this invention also relates to means for eliminating composite sticking in a hot press where the hydrogen peroxide treatment is used.

BACKGROUND OF THE INVENTION

There is a need for lignocellulosic composites that are dimensionally stable when exposed to moisture. There is a further need for lignocellulosic composites that do not swell when immersed in water and that do not shrink when dried. There is still a further need for lignocellulosic composites that do not darken in color when formed in a hot press.

Lignocellulosic composites are conventionally manufactured by hot pressing lignocellulosic materials with wax and thermosetting resin. This is referred to as a conventional bonding process. The wax is a sizing agent to improve the water resistance of the once-formed composite. The resin is a binding agent that holds the materials comprising the composite together, thus forming them into a unitary shape. Resoles are commonly used as the binding resin for lignocellulosic composites. The use of resoles to bind the composite results in a darkening of the color of the composite on setting of the resin in the hot press.

In the conventional hot press method of manufacture of lignocellulosic composites, a lignocellulosic material is combined with a phenolic resin and other components in a blender or mixer. The blend or mixture that results is pressed, typically under pressures above atmospheric and temperatures greater than room temperature, to produce the composite. Lignocellulosic materials used in the production of mats may be selected from the group consisting of wood fiber, wood flake, wood strands, wood chips and wood particles, and mixtures thereof. The lignocellulosic materials listed here are referred to in the art as wood furnish. However, it is well known that other wood furnish, such as straw, bagasse, wood bark, recycled wood fiber, recycled paper fiber, and mixtures thereof, may also be used. The wood furnish, once blended or mixed with the phenolic resin, is then formed onto a support material to make a pre-form in the approximate shape of the finished good. The pre-form is then placed on a caul plate in a hot press where the finished good is produced by applying pressures above atmospheric and temperatures greater than room temperature. The elevated temperatures and pressures cause the phenolic resin to polymerize, thus binding the pre-form into a unitary finished good. The hot press method is further described in U.S. Pat. No. 4,433,120 to Shui-Tung Chiu.

Lignocellulosic composites primarily find use in construction or fabrication. These composites may be used in building construction or any fabrication where wood is a traditional material used. The poor dimensional stability of state-of-the-art lignocellulosic composites affects their mechanical properties and reduces their load carrying ability. Another result of poor dimensional stability is unevenness of roof and floor underlayments, and of building siding.

Two methods have been principally suggested as means to produce dimensionally stable lignocellulosic composites. However, both of these method have proven to be too costly to be used in practice. The first method is referred to as Bulking Treatment. In this method, lignocellulosic materials are impregnated with water soluble polymers such as polyethylene glycol or impregnated with a low molecular weight resin such as phenol-formaldehyde or vinyl monomers and polymerized in situ. The second method is referred to as Chemical Modification. In this method the lignocellulose may be esterified by, for example, acetylation, or it may be cross-linked using, for example, an aldehyde. An alternative method of Chemical Modification is to react hemicellulose with lignin under elevated temperatures, typically using steam treatment. Any of these methods of Chemical Modification, in addition to being costly, also result in reduced strength of the once-formed composite.

A method widely used in the conventional bonding process to improve dimensional stability, as noted above, is the application of a wax sizing agent. This wax sizing imparts a certain degree of water repellency to the once-formed composite. Paraffin is a common sizing agent. One method by which wax sizing impart water repellency is by coating the surface of the lignocellulose, thus decreasing its surface tension. Another method by which wax sizing imparts water repellency is that the wax will partially fill the capillaries within the lignocellulose, thus providing a barrier to the capillary uptake of water.

Hydrogen peroxide has been used in conventional bonding processes. Chapman and Jenkin, in "Hydrogen Peroxide as a Resin Cure Accelerator," *Journal of Adhesion,* Volume 19 (1986), disclose the use of hydrogen peroxide for its heating potential. The exothermic reaction of hydrogen peroxide may be used to reduce the hot pressing time for making medium density fiberboard and particleboard with urea-formaldehyde and tannin resin. However, Chapman and Jenkin did not use wax in their formulation and did not evaluate the water resistance of their products. Chapman and Jenkin, in this same reference, described the treating of a veneer surface with hydrogen peroxide for the reduction of the press time of a plywood made with a phenol- formaldehyde resin and tannin resin.

There are also known non-conventional bonding processes for manufacturing lignocellulosic composites. These methods are characterized by surface treatment of the lignocellulose with an oxidant and then either hot pressing the treated lignocellulose to form the composite, with or without a catalyst, or applying a polymeric just before hot pressing. Examples of these non-conventional bonding processes follow.

Zavarin has shown that hydrogen peroxide may be used as the oxidant in non-conventional bonding processes. See E. Zavarin, "Activation of Wood Surfaces and Non-Conventional Bonding," *The Chemistry of Solids Wood,* ACS Advances in Chemistry Series No. 207 (1984). The hydrogen peroxide is believed to induce surface activation for bonding in which a conventional resin binder is not used.

Another non-conventional bonding process is described in U.S. Pat. No. 4,022,965 to Goheen, et al. In the process disclosed therein, hydrogen peroxide, in the presence of a sulfuric acid catalyst, is used to first oxidize wood chip fibers. Then the wood chips are mechanically refined to produce fibers. Next, the residual oxidant and catalyst are removed by water washing before the fibers are hot pressed to form the composite.

Yet another non-conventional bonding process is described in U.S. Pat. No. 4,007,321 to Scholz, et al. Here the inventors disclose a means to bond veneers or wood particles comprising applying hydrogen peroxide, among other oxidants, a metal-acid catalyst, and then hot pressing the mixture. By this process, a pH of from 0.5 to 1.5 is required at hot pressing in order to produce a weather resistant composite.

One non-conventional bonding process, disclosed by Philippou et al. in "Bonding of Particleboard Using Hydrogen Peroxide," *Forest Products Journal,* Volume 32 (1982), is said to produce water-resistant flakeboards. Here the authors disclose a process wherein wood flake is first treated with hydrogen peroxide. The wood flake is next mixed with ammonium lignosulfonate, furfuryl alcohol, and maleic acid, which then react to form the composite. Maleic acid is a catalyst for the cross-linking reaction of the ammonium lignosulfunate and furfuryl alcohol. Treating the wood apparently provides grafting sites for the polymers from the reaction of the ammonium lignosulfunate and furfuryl alcohol. The water resistance of the resulting flakeboard can be improved by incorporating a wax emulsion with the addition of the reactants. However, it is reported that the use of the wax emulsion negatively effects the mechanical properties of the flakeboard when it is applied at 1% or higher based on the dry wood weight.

Philippou et al. in "Bonding Wood by Graft Polymerization. The Effect of Hydrogen Peroxide Concentration on the Bonding and Properties of Particleboards." *Holzforschung,* Volume 36 (1982), also disclose activating wood particle surfaces by applying hydrogen peroxide and then bonding the wood particles using acid-catalyzed polymerizable materials. Here, as previously described, cross-linking of mixtures of ammonium lignosulfonate, and furfuryl alcohol or formaldehyde, with lignocellulose is catalyzed using maleic acid. However, the authors disclose no use of wax or wax emulsions. Resistance to water or moisture, measured by the resistance to swelling upon exposure, was reported to be improved by use of increasing amounts of hydrogen peroxide.

The phenol-formaldehyde resin used in the manufacture of lignocellulosic composites may be in the form of a solid or a liquid. Powdered phenolic resins, such as novolac, resole, or combinations thereof, may generally be used. U.S. Pat. No. 4,098,770 to Berchem, et al., discloses a typical spray-dried phenol-formaldehyde resin, modified with added non-phenolic polyhydroxy compounds, used in the manufacture of waferboard. Liquid phenol-formaldehyde resins, such as resole or resole and novolac combinations, may also be generally used in the manufacture of lignocellulosic composites. Parameters for the manufacture of either liquid or solid phenol-formaldehyde resins are disclosed in *Phenolic Resins, Chemistry, Applications and Performance,* (A. Knop and L. A. Pilato, Springer-Verlag (1985)) and *Advance Wood Adhesives Technology,* (A Pizzi, Marcel Dekker (1994)).

OBJECTS OF THE INVENTION

It is one object of this invention to provide a method for the manufacture of lignocellulosic composites that results in a reduction of thickness swell when the composite is exposed to water.

It is a further object of this invention to provide a method for making lignocellulosic composites that allows the incorporation of wax sizing without an attendant loss in mechanical strength.

It is yet a further object of this invention to provide a method for the manufacture of lignocellulosic composites that improves the release of the composite from the caul plate when hydrogen peroxide is incorporated into the mixture forming the mat.

It is yet another object of this invention to provide a method for making lignocellulosic composites that takes advantage of the beneficial exotherm from reacting hydrogen peroxide with the mat composition and thereby reduces the cure time necessary to attain useful mechanical properties.

It is still a further object of this invention to provide a method for the manufacture of lignocellulosic composites that allows the production of light-colored composites when hydrogen peroxide is incorporated into the mixture forming the mat.

SUMMARY OF THE INVENTION

In one aspect of this invention, there is provided a process by which the moisture derived thickness swell of the lignocellulosic composite formed by the process is reduced as compared to conventional processes. By introducing hydrogen peroxide, or other peroxides, onto a furnish that has a moisture content of 8% or less, based on the dry furnish weight, and then hot pressing the resulting mat, the thickness swell of the resulting composite is greatly reduced.

In another aspect of this invention there is provided a process by which the exotherm realized due to the use of hydrogen peroxide is beneficially used to reduce press times. By selecting the furnish moisture content so that it is at or below 8%, the heat of reaction of the hydrogen peroxide is utilized to cure the binding resin, thereby reducing press times.

In a further aspect of this invention there is provided a process by which caul plate sticking is reduced and whereby light-colored composites may be produced. It is known in the art that the use of hydrogen peroxide as an add-on to the furnish ultimately leads to a sticking of the hot-pressed composite to the caul plate. It has been found that the use of ammoniated hydrogen peroxide solutions reduces caul plate sticking. Furthermore, when these ammoniated hydrogen peroxide solutions are used, light-colored composites are produced.

In still a further aspect of this invention there is provided a method by which the use of wax sizing does not result in a reduction of the mechanical properties of the resulting composite. The combination of factors for the use of peroxides that is disclosed herein also leads to the use of wax sizing without loss of mechanical properties such as strength. It was previously known in the prior art that wax sizing could be beneficial in providing moisture resistance to the composite, but that the use of the wax deteriorated the physical performance of the composite.

DETAILED DESCRIPTION OF THE INVENTION

The methods of this invention are for the production of composite panels made from lignocellulosic material. Lignocellulosic materials used may be selected from the group consisting of wood fiber, wood flake, wood strands, wood chips and wood particles, and mixtures thereof. The lignocellulosic materials listed here are referred to in the art as wood furnish. However, it is well known that other furnish, such as straw, bagasse, wood bark, recycled wood fiber, recycled paper fiber, and mixtures thereof, may also be used. The composite panels thus produced are known as fiberboard, waferboard, strandboard, oriented strandboard, flakeboard, particleboard and the like.

In a typical manufacturing process, based on this invention, for making composite panels, furnish is sprayed with a hydrogen peroxide solution, wax sizing and a binding resin is applied either by spraying it on as liquid or mixing it in as a solid. Hydrogen peroxide may be obtained from any commercial or laboratory supplier of hydrogen peroxide solutions. Wax sizing may be selected from the group comprising molten slack wax, vegetable wax, paraffin wax, and the like, including aqueous emulsion versions. The binding resin used may be selected from the group comprising of isocyanate resin, phenol-formaldehyde-urea resin, phenol-formaldehyde-melamine resin, phenol-formaldehyde resin, melamine-urea-phenol-formaldehyde resin, and mixtures thereof, and the like. The phenol-based resins may be liquid at room temperature or they may be solid, such as spray-dried resin powders. Furthermore, the phenol-based resins may be either novolac, resole, or combinations of these two general types of phenolic resins. When the binding resin is a solid, it is mixed into the furnish using any of a variety of well-known mechanical means for mixing.

Once the proper components in the proper amounts are applied to the furnish or blended or mixed together with the furnish, the composite panel is produced using the method disclosed above. This comprises felting out a mat on the press' caul plate and then hot pressing the mat for a prescribed amount of time at a prescribed temperature.

Examples are provided below that will describe the invention, the best mode, and enable those skilled in the art to practice the invention disclosed herein.

EXAMPLES

In the examples that follow, hydrogen peroxide solutions were commercial products having pH of between 2 and 3 standard units. The concentrations used were either 30 weight percent or 50 weight percent. The hydrogen peroxide concentration was determined by the "iodometric method" as described in Vogel's *Textbook of Quantitative Chemical Analysis,* 5th Edition (1989) at pp. 394–395.

Wax used in these examples was a commercial slack wax or emulsified wax used by the oriented standboard (OSB) industry. The wax emulsion was EW58LV, a product of Borden Chemical—Canada, a division of The Borden Company, Limited (hereinafter "The Borden Company, Limited"). This wax emulsion contains 58% wax and has a pH of 8.7.

Two phenol-formaldehyde resins, available from The Borden Company, Limited, were used in the examples. One resin is commercially available under the product name W8712P. This is a spray-dried resole powder resin containing 9.3% sodium hydroxide and 91.0% non-volatile components. This resin has a number average molecular weight of 1700. The second resin is a liquid resole product commercially available under the product name W8712. This liquid resole typically contains 5.0% sodium hydroxide and 43.1% non-volatile components. This resin has a Brookfield viscosity at 25° C. of 100 to 135 centipoise, and a number average molecular weight of 2130.

In order to test the properties of the disclosed method, laboratory-sized waferboards measuring 254 mm×254 mm×11.1 mm were made. This was accomplished by first felting the hydrogen peroxide, wax, and resin treated furnish on a carbon steel caul plate to form a mat. Next, the mat was pressed under pressure and an elevated temperature for a specified amount of time. The press times include 30 seconds degassing time. The maximum pressure applied to any one mat was 3.5 MPa.

The mat moisture content was measured for each specimen prepared. Mat moisture was determined after blending the wood furnish with hydrogen peroxide, wax, and resin. This was accomplished using the "moisture teller" method of testing machines (Dietert brand moisture teller). This method consists of weighing 19–21 grams of wet wood furnish and drying with 133° C. hot air for 15 minutes. After cooling in a desicator, re-weigh the dried furnish weight. The mat moisture content was then calculated from the ratio of the weight difference of the wet and dried furnish to the weight of the dried furnish.

The waferboards made as described above were then cut into specimens and tested for internal bond (IB), 2 hour boiled modulus of rupture (MOR), thickness swell after being soaked in cold (23° C.) water for 24 hours. Release from the caul plate after pressing was also observed. For each panel, three 51 mm×51 mm pieces were cut for board density and IB determinations. Two 51 mm×203 mm pieces were used for the 24 hour cold water soak thickness swell and 2 hour boiled MOR tests. The thickness of all specimens was 11.1 mm.

The cold water thickness swell test consisted of placing a specimen in a water bath, maintained at 23° C. for 24 hours. The specimen was held at 25 mm below the water surface for the 24 hour immersion period. Thickness swell was determined by measuring the thickness of the specimen at its center point before and after soaking in cold water for 24 hours.

The IB and 2 hour boiled MOR tests were conducted according to the CSA standard CAN3-0437.1.

EXAMPLE 1

Waferboards made by hot pressing mats at 210° C. and press times of 3.0, 3.5, 4.0 and 4.5 minutes. The mats were made by mixing oriented strandboard (OSB) furnish, hydrogen peroxide, wax, and a phenol-formaldehyde resin, using a laboratory mixer.

In making the mats, a commercial aspen wood OSB furnish, having a 2.5% moisture content, was first sprayed with 2.0% of a hydrogen peroxide solution. The hydrogen peroxide solution was a commercial grade 30% hydrogen peroxide solution. The OSB furnish was then sprayed with 1.5% molten slack wax. The application percentages of the hydrogen peroxide solution and the slack wax are both based on the weight of the dry furnish. The mixture of OSB furnish, hydrogen peroxide and slack wax was then blended with 2.45% of a phenol-formaldehyde powder resin, W8712P, using a conventional laboratory mixer.

Mat moisture was determined after blending the OSB furnish, hydrogen peroxide, slack wax, and phenol-formaldehyde resin using the "moisture teller" method. The mat moisture content for Example 1 was measured at 8.8%.

COMPARATIVE EXAMPLE 1

A control for comparison to Example 1 was made by replacing the hydrogen peroxide solution with water and keeping all other weights and conditions the same as used in Example 1. Waferboard was made, as in Example 1, by hot pressing mats at 210° C. and press times of 3.0, 3.5, 4.0 and 4.5 minutes.

TABLE 1

Results of Testing Example 1 and Comparative Example 1

| Press Time (minutes) | Board Density (kg/m³) | Internal Bond (MPa) | 2 hour Boiled MOR (MPa) | Thickness Swell (%) |
|---|---|---|---|---|
| Example 1 (with 2% hydrogen peroxide) | | | | |
| 3.0 | 778.5 | 0.512 | 13.37 | 11 |
| 3.5 | 703.2 | 0.524 | 17.20 | 11 |
| 4.0 | 727.2 | 0.488 | 15.56 | 11 |
| 4.5 | 778.5 | 0.635 | 17.57 | 11 |
| Average | 746.4 | 0.540 | 15.93 | 11 |
| Comparative Example 1 (no hydrogen peroxide) | | | | |
| 3.0 | 735.2 | 0.469 | 17.37 | 19 |
| 3.5 | 756.1 | 0.547 | 16.88 | 18 |
| 4.0 | 748.0 | 0.579 | 17.17 | 18 |
| 4.5 | 704.8 | 0.515 | 15.44 | 18 |
| Average | 736.8 | 0.527 | 16.71 | 18 |

The results of Table 1 show that the combination of long press times of 3.0 to 4.5 minutes and hydrogen peroxide use do not affect the internal bond or the 2 hour boiled MOR properties. However, thickness swell is reduced by about 39% due to the use of hydrogen peroxide. It was observed that the waferboards made where hydrogen peroxide was employed tended to stick to the bottom caul plate after hot pressing.

EXAMPLE 2

Waferboards made by hot pressing mats at 210° C. and press times of 1.75, 2.00, 2.25, 2.50 and 3.00 minutes. The mats were made by mixing oriented strandboard (OSB) furnish which contained a mixture of aspen and pine woods, hydrogen peroxide, molten slack wax, and a phenol-formaldehyde resin, using a laboratory mixer.

In making the mats, a commercial OSB furnish consisting of a mixture of aspen and pine woods, having a 2% moisture content, was first sprayed with either 1.0% or 2.0% of a hydrogen peroxide solution. The hydrogen peroxide solution was a commercial grade 50% hydrogen peroxide solution. The OSB furnish was then sprayed with 1.5% molten slack wax. The furnish was next sprayed with 2.62% of a liquid phenol-formaldehyde resin, W8712. The application percentages of the hydrogen peroxide solution and the slack wax are both based on the weight of the dry furnish. The phenol-formaldehyde resin, W8712, was added based on the total weight of the furnish plus molten slack wax plus hydrogen peroxide solution. The mixture of OSB furnish, hydrogen peroxide, slack wax, and W8712 was then blended with 1.22% of a spray-dried phenol-formaldehyde resin, W8712P, using a conventional laboratory mixer.

Mat moisture was determined after blending the OSB furnish, hydrogen peroxide, slack wax, and phenol-formaldehyde resins using the "moisture teller" method. The mat moisture contents for Example 2 were measured at 6.8% where 1.0% of the hydrogen peroxide solution was applied, and 7.6% where 2.0% of the hydrogen peroxide solution was applied.

In this example, and Comparative Example 2 and Comparative Example 3 that follow, the core temperature of the waferboard during hot pressing was measured and recorded. This was accomplished by placing a thermocouple in the center of the mat and then recording the thermocouple output onto a recorder. The recorder plotted the results in two dimensions. One dimension represented the measured temperature, while the second dimension represented the time of residence in the press.

COMPARATIVE EXAMPLE 2 (no hydrogen peroxide)

A control for comparison to Example 2 was made by replacing the hydrogen peroxide solution with water and keeping all other weights and conditions the same as used in Example 2. The mat moisture content was determined to be 7.1% by the "moisture teller" method. Waferboard was made, as in Example 2, by hot pressing mats at 210° C. and press times of 1.75, 2.00, 2.25 and 3.00 minutes.

COMPARATIVE EXAMPLE 3 (no molten slack wax)

A second control for comparison to Example 2 was made by eliminating the addition of molten slack wax, using only a 2.0% addition of hydrogen peroxide solution, and keeping all other weights and conditions the same as used in Example 2. The mat moisture content was determined to be 7.4% by the "moisture teller" method. Waferboard was made, as in Example 2, by hot pressing mats at 210° C. and press times of 1.75, 2.00, 2.25 and 3.00 minutes.

Results of Tests for Example 2, Comparative Example 2, and Comparative Example 3

The results are presented in Table 2 given below. All measurements were made according to the methods disclosed above.

In each of the tests, Example 2, Comparative Example 2, and Comparative Example 3, replicate measurements were made as follows. For the internal bond measurements, the values given in the results table are the average of three measurements. In the 2 hour boiled MOR measurements, the values given in the results table are the average of two measurements. For the thickness swell results, the values given in the results table are average of two measurements.

TABLE 2

Results of Testing Example 2 and Comparative Example 2 and Comparative Example 3

| Press Time (minutes) | Board Density (kg/m³) | Maximum Core Temperature (° C.) | Internal Bond (MPa) | 2 Hour Boiled MOR (MPa) | Thickness Swell (%) |
|---|---|---|---|---|---|
| Example 2; Hydrogen Peroxide: 1.0%; Molten Slack Wax: 1.5% | | | | | |
| 1.75 | 708.0 | 135 | 0.148 | 04.12 | 31 |
| 2.00 | 740.0 | 149 | 0.172 | 05.01 | 28 |
| 2.25 | 765.7 | 149 | 0.476 | 10.15 | 29 |
| 2.50 | 788.1 | 151 | 0.535 | 12.39 | 23 |
| 3.00 | 748.0 | 154 | 0.600 | 13.08 | 21 |
| Example 2; Hydrogen Peroxide: 2.0%; Molten Slack Wax: 1.5% | | | | | |
| 1.75 | 775.3 | 154 | 0.296 | 04.29 | 23 |
| 2.00 | 752.8 | 162 | 0.578 | 12.13 | 21 |
| 2.25 | 775.3 | 166 | 0.546 | 12.84 | 19 |
| 2.50 | 764.1 | 170 | 0.700 | 13.66 | 15 |
| 3.00 | 770.5 | 175 | 0.660 | 15.82 | 15 |
| Comparative Example 2; Hydrogen Peroxide: 0%; Molten Slack Wax: 1.5% | | | | | |
| 1.75 | 719.2 | 123 | 0.000 | 0.00 | 35 |
| 2.00 | 759.3 | 135 | 0.128 | 3.64 | 33 |
| 2.25 | 700.0 | | 0.078 | 0.00 | 23 |
| 2.50 | 720.8 | 143 | 0.112 | 3.38 | 23 |
| 3.00 | 716.0 | 143 | 0.288 | 5.14 | 21 |

TABLE 2-continued

Results of Testing Example 2 and
Comparative Example 2 and Comparative Example 3

| Press Time (minutes) | Board Density (kg/m³) | Maximum Core Temperature (° C.) | Internal Bond (MPa) | 2 Hour Boiled MOR (MPa) | Thickness Swell (%) |
|---|---|---|---|---|---|
| Comparative Example 3; Hydrogen Peroxide: 2.0%; Molten Slack Wax: 0% | | | | | |
| 1.75 | 696.8 | 143 | 0.094 | 0.00 | 47 |
| 2.00 | 738.4 | 147 | 0.199 | 0.00 | 40 |
| 2.25 | 752.8 | 157 | 0.303 | 4.05 | 40 |
| 2.50 | 772.1 | 169 | 0.419 | 9.96 | 37 |
| 3.00 | 791.3 | | 0.523 | 9.14 | 40 |

The results given in Table 2 above illustrate the following points. The maximum core temperature in the waferboard increased with an increase in press time and hydrogen peroxide content. The internal bond and the 2 hour boiled MOR were significantly improved with the use of hydrogen peroxide. The thickness swell was significantly reduced by the incorporation of wax. However, there was an even further reduction in the thickness swell where hydrogen peroxide and wax were used in combination. Accordingly, at shorter press times, higher strength properties and better dimensional stability can be achieved where hydrogen peroxide is applied to the furnish.

EXAMPLE 3

In this example, waferboards made by hot pressing mats at 210° C. and press times 1.75, 2.00, 2.25, 2.50 and 3.00 minutes. The mats were made by mixing oriented strandboard (OSB) furnish which contained a mixture of aspen and pine woods, hydrogen peroxide, emulsified slack wax, and a phenol-formaldehyde resin, using a laboratory mixer.

In making the mats, a commercial OSB furnish consisting of a mixture of aspen and pine woods, having a 2% moisture content, was first sprayed with 2.0% of a hydrogen peroxide solution. The hydrogen peroxide solution was a commercial grade 50% hydrogen peroxide solution. The OSB furnish was then sprayed with either 0.5%, 1.0%, 1.5% or 2.0% wax from a commercial wax emulsion. The wax emulsion was EW58LV of The Borden Company, Limited. The wax content of EW58LV was 58%. The application percentages of the hydrogen peroxide solution and the wax are both based on the weight of the dry furnish. The mixture of OSB furnish, hydrogen peroxide, and the wax, was then blended with 2.44% of a spray-dried phenol-formaldehyde resin, W8712P, using a conventional laboratory mixer.

Mat moisture was determined after blending the OSB furnish, hydrogen peroxide, wax emulsion and phenol-formaldehyde resins using the "moisture teller" method. The mat moisture contents for Example 3 were measured at 7.7%, 6.6%, 7.4% and 8.0% where 0.5%, 1.0%, 1.5% and 2.0% of the wax was applied, respectively. Here, as in previous measurements, mat moisture was determined using the "moisture teller" method.

TABLE 3

Results of Testing Example 3

| Press Time (minutes) | Board Density (kg/m³) | Internal Bond (MPa) | 2 Hour Boiled MOR (MPa) | Thickness Swell (%) |
|---|---|---|---|---|
| Emulsified Wax: 0.5% | | | | |
| 1.75 | 692.0 | 0.114 | 03.88 | 28 |
| 2.00 | 647.1 | 0.461 | 12.92 | 20 |
| 2.25 | 679.2 | 0.411 | 15.11 | 18 |
| 2.50 | 698.4 | 0.609 | 17.57 | 18 |
| 3.00 | 669.5 | 0.574 | 20.38 | 18 |
| Emulsified Wax: 1.0% | | | | |
| 1.75 | | | | |
| 2.00 | 676.0 | 0.445 | 15.57 | 13 |
| 2.25 | 676.0 | 0.532 | 16.01 | 15 |
| 2.50 | 727.2 | 0.603 | 20.61 | 13 |
| 3.00 | 669.5 | 0.520 | 12.01 | 12 |
| Emulsified Wax: 1.5% | | | | |
| 1.75 | 676.0 | 0.083 | 06.15 | 20 |
| 2.00 | 692.0 | 0.481 | 09.98 | 14 |
| 2.25 | 706.4 | 0.522 | 14.48 | 14 |
| 2.50 | 708.0 | 0.593 | 17.03 | 13 |
| 3.00 | 736.0 | | 20.26 | 12 |
| Emulsified Wax: 2.0% | | | | |
| 1.75 | 677.6 | 0.364 | 15.11 | 13 |
| 2.00 | 732.0 | 0.516 | 17.87 | 10 |
| 2.25 | 693.6 | 0.456 | 15.82 | 13 |
| 2.50 | 720.8 | | 12.11 | 11 |
| 3.00 | 660.0 | 0.558 | 14.60 | 12 |

As shown in Table 3, the optimum wax content is about 1% based on the weight of dry furnish. These results confirm that waferboard produced using 2% hydrogen peroxide and over 1% wax show reduced thickness swell and good mechanical properties at short press times.

EXAMPLE 4

This example illustrates the effect of applying a pre-mix formed from a hydrogen peroxide solution and a wax emulsion. This pre-mix was sprayed onto wood furnish and then the process for manufacturing waferboard was carried out. The hydrogen peroxide solution was a commercial grade product containing 50 weight percent hydrogen peroxide. The wax emulsion was EW58LV, a product of The Borden Company, Limited. This wax emulsion contains 58% wax and has a pH of 8.7. Three different pre-mixes were made and used in the manufacture of waferboard as described below.

These pre-mixes were in some cases pH-adjusted using 85% triethanolamine. This tertiary amine product is available from Van Waters & Rogers Ltd. In one case, hydrated sodium silicate ($Na_2SiO_3!9H_2O$) was added to the pre-mix. Hydrated sodium silicate may be obtained from Fisher Scientific.

Pre-Mix A. Four parts of 50% hydrogen peroxide solution were mixed with 1.72 parts of EW58LV. This pre-mix contained a 2:1 ratio of hydrogen peroxide to wax. The pH of the pre-mix was measured at 5.0.

Pre-mix A was sprayed onto 102 parts of a commercial OSB furnish which contained 2% moisture. The sprayed wood furnish was then blended with 2.44 parts of W8712P powder phenol-formaldehyde resin. The resulting mat moisture, by "moisture teller" method, was measured at 7.7%.

Pre-Mix B. Four parts of 50% hydrogen peroxide solution were mixed with 1.72 parts of EW58LV that contained 0.017 parts of 85% triethanolamine. The pH of the pre-mix was measured at 6.6.

Pre-mix B was sprayed onto 102 parts of a commercial OSB furnish which contained 2% moisture. The sprayed wood furnish was then blended with 2.44 parts of W8712P powder phenol-formaldehyde resin. The resulting mat moisture, by "moisture teller" method, was measured at 7.4%.

Pre-Mix C. Four parts of 50% hydrogen peroxide solution were mixed with 0.05 parts of 85% triethanolamine and 0.073 parts of hydrated sodium silicate ($Na_2SiO_3$,$9H_2O$) and this mixture was then mixed with 1.72 parts of EW58LV. The pH of the pre-mix was measured at 7.2.

Pre-mix C was sprayed onto 102 parts of a commercial OSB furnish which contained 2% moisture. The sprayed wood furnish was then blended with 2.44 parts of W8712P powder phenol-formaldehyde resin. The resulting mat moisture, by "moisture teller" method, was measured at 6.7%.

All of the above mats contained 2% hydrogen peroxide, 1% wax, and 2.44% W8712P powder phenol-formaldehyde resin, each based on the weight of dry wood furnish.

Waferboards measuring 254 mm×254 mm×11.1 mm were made by first felting the mats onto a carbon steel caul plate that had been previously treated with 15% sodium silicate solution ($Na_2SiO_3$,$9H_2O$) and then hot pressing the mats at 210° C. for either 1.75, 2.00, 2.25, 2.50 or 3.00 minutes.

TABLE 4

Results of Testing Example 4

| Press Time (minutes) | Board Density (kg/m³) | Internal Bond (MPa) | 2 Hour Boiled MOR (MPa) | Thickness Swell (%) |
|---|---|---|---|---|
| Mats Made Using Pre-Mix A ||||| 
| 1.75 | 724.0 | 0.256 | 04.85 | 15 |
| 2.00 | 661.5 | 0.146 | 10.38 | 14 |
| 2.25 | 735.2 | 0.539 | 11.66 | 13 |
| 2.50 | 751.2 | 0.607 | 14.97 | 11 |
| 3.00 | 762.5 | 0.627 | 16.90 | 12 |
| Mats Made Using Pre-Mix B ||||| 
| 1.75 | 716.0 | 0.353 | 03.72 | 16 |
| 2.00 | 709.6 | 0.548 | 09.65 | 17 |
| 2.25 | 756.1 | 0.607 | 11.38 | 15 |
| 2.50 | 719.2 | 0.586 | 14.78 | 16 |
| 3.00 | 748.0 | 0.527 | 18.48 | 11 |
| Mats Made Using Pre-Mix C ||||| 
| 1.75 | 692.0 | 0.211 | 07.74 | 18 |
| 2.00 | 674.4 | 0.415 | 09.75 | 16 |
| 2.25 | 706.4 | 0.468 | 10.00 | 16 |
| 2.50 | 680.8 | 0.567 | 09.49 | 15 |
| 3.00 | 730.4 | 0.698 | 13.79 | 15 |

The values in Table 4 above are averages of replicate measurements in some cases. The results of the internal bond measurements are the average of three replicate measurements. For the 2 hour boiled MOR test, two replicate measurements were made. Also, for the thickness swell test, two replicate measurements were made.

The results demonstrate that the use of pre-mixes of hydrogen peroxide and emulsified wax yield increases in the curing speed and reductions in thickness swell. Also, the lower the pH value of the pre-mix, the lower the thickness swell. It was noted in the course of making the waferboards that the use of the sodium silicate solution reduced caul plate sticking.

EXAMPLE 5

This example demonstrates that the use of ammoniated hydrogen peroxide solution reduces caul plate sticking and also lighter color waferboards can be produced. The ammoniated hydrogen peroxide solutions were prepared by mixing a hydrogen peroxide solution with ammonia water that contained a metal chelating agent.

In making the ammoniated hydrogen peroxide solution, a commercial 26° Be' ammonia water, containing from about 28% to about 30% ammonia, was first treated with 1.25% by weight of a metal chelating agent. In this example, the metal chelating agent was Versenol 120 sold by Dow Chemical Company. This chelating agent contains 40 weight percent of the trisodium salt of N-hydroxyethylenediamine-triacetate. Other chelating agents are envisioned. Accordingly, a chelating agent may be selected from group comprising amino acid-type chelating agents. To make the complete ammoniated hydrogen peroxide solution, 100 parts of the 50% hydrogen peroxide solution are mixed with 0.35 parts of the ammonia water treated with chelating agent. For this example, the ammoniated hydrogen peroxide solution had a pH of 6.5.

Three batches of 2.7% moisture content commercial aspen wood OSB furnish were first sprayed with 2% of the previously made ammoniated hydrogen peroxide solution. Next, these batches were sprayed with molten wax at either 1.2%, 2.0% or 3.0%, based on the dry wood furnish weight. Each batch was then blended with 2.44% of W8712P phenol-formaldehyde resin powder. The mat moisture contents were 7.6%, 7.8%, and 7.1%, for the wax contents of 1.2%, 2.0% and 3.0%, respectively.

For each batch, the ammoniated hydrogen peroxide, wax, and resin treated furnish was felted onto a carbon steel caul plate that had been previously treated with 15% sodium silicate solution. As done in the previous examples, waferboards were made by hot pressing the mats at 210° C. for either 1.75, 2.00, 2.50 or 3.00 minutes.

After hot pressing, the waferboards all exhibited excellent release from the caul plate. The surfaces of the waferboards were light in color and no cured resin spots were shown on the board surface.

Table 5, shown below, shows the results of testing for Example 5. These results indicate that the ammoniated hydrogen peroxide solution reduced the thickness swell and the cure time to reach strength. The results also show that increasing the wax content results in an improvement of all properties when the press time is greater than 2.00 minutes. The results show averages of replicate measurements in some cases. For the internal bond test, the values given are the averages of three replicate measurements. For the 2 hour boiled MOR results, two replicates were used. Two replicates were also used to determine the thickness swell results.

TABLE 5

Results of Testing Example 5

| Press Time (minutes) | Board Density (kg/m³) | Internal Bond (MPa) | 2 Hour Boiled MOR (MPa) | Thickness Swell (%) |
|---|---|---|---|---|
| Mats Made Using 1.2% Wax ||||| 
| 1.75 | 645.5 | 0.121 | 03.64 | 22 |
| 2.00 | 642.3 | 0.336 | 09.82 | 20 |
| 2.25 | 600.7 | 0.341 | 12.21 | 15 |
| 2.50 | 626.3 | 0.425 | 12.20 | 13 |

TABLE 5-continued

Results of Testing Example 5

| Press Time (minutes) | Board Density (kg/m³) | Internal Bond (MPa) | 2 Hour Boiled MOR (MPa) | Thickness Swell (%) |
|---|---|---|---|---|
| 3.00 | 728.8 | 0.572 | 15.06 | 14 |
| Mats Made Using 2.0% Wax | | | | |
| 1.75 | 647.1 | 0.154 | 08.07 | 19 |
| 2.00 | 666.3 | 0.363 | 12.13 | 14 |
| 2.25 | 679.2 | 0.447 | 12.86 | 17 |
| 2.50 | 687.2 | 0.492 | 13.50 | 17 |
| 3.00 | 714.4 | 0.521 | 15.85 | 13 |
| Mats Made Using 3.0% Wax | | | | |
| 1.75 | 679.2 | 0.000 | 07.86 | 17 |
| 2.00 | 759.3 | 0.478 | 14.18 | 12 |
| 2.25 | 730.4 | 0.537 | 15.20 | 13 |
| 2.50 | 772.1 | 0.560 | 16.01 | 11 |
| 3.00 | 746.4 | 0.522 | 16.86 | 13 |

CONCLUSION

Thus it is apparent that there has been provided, in accordance with the present invention, a method for producing lignocellulosic composites that filly satisfies the objects, aims and advantages set forth above. While the invention has been described with specific embodiments, it is evident that many alternatives, modifications and variations will be apparent to those skilled in the art in light of the foregoing description. Accordingly, it is intended to include all such alternatives, modifications and variations as set forth within the spirit and scope of the appended claims.

What is claimed is:

1. A method of preparing lignocellulosic composites comprising the steps of:
   (a) preparing a mat having a moisture content of from about 4.5% to less than 8% based on the dry mat weight including the steps of mixing or blending 4furnish, a peroxide compound, a wax, and a binding resin;
   (b) placing the mat having the moisture content in a hot press wherein the hot press has at least a platen;
   (c) hot pressing the mat in the hot press;
   (d) increasing the core temperature of the mat such that within the first 3 minutes of the hot pressing the core temperature of the mat is at least 140° C. at a hot press temperature of from about 180° C. to about 230° C.; and
   (e) continuing the hot pressing of the mat until the mat is cured;
   wherein the furnish is selected from the group consisting of wood fiber, wood flake, wood strands, wood chips, wood particles, straw, bagasse, wood bark, recycled wood fiber, recycled paper fiber, and mixtures thereof;
   wherein the peroxide compound is a hydrogen peroxide containing solution;
   wherein the wax is selected from the group consisting of molten slack wax, vegetable wax, and paraffin wax, including aqueous emulsion versions; and
   wherein the binding resin is a phenol-formaldehyde resin.

2. The method of claim 1 wherein the phenol-formaldehyde resin is a spray-dried resole or novolac.

3. The method of claim 1 wherein the peroxide compound is hydrogen peroxide and it is added at from about 1% to about 3% based on the dry weight of the furnish.

4. The method of claim 3 wherein the hydrogen peroxide is added at from about 1.5% to about 2.5%.

5. The method of claim 1 wherein the peroxide compound is added in an amount such that when calculated as a hydrogen peroxide equivalent weight the addition is from about 1% to about 3% based on the dry weight of the furnish.

6. The method of claim 1 wherein the wax is added at from about 0.5% to about 2.5% based on the dry weight of the furnish.

7. The method of claim 6 wherein the wax is added at from about 0.8% to about 2.0% based on the dry weight of the furnish.

8. The method of claim 1 wherein the binding resin is added at from about 2% to about 5% based on the dry weight of the furnish.

9. The method of claim 8 wherein the binding resin is added at from about 2.2% to about 4.0% based on the dry weight of the furnish.

10. The method of claim 1 wherein the wax and peroxide compound are pre-mixed.

11. The method of claim 1 wherein a pH adjusting additive selected from the group consisting of ammonia water, ammonia gas, and ammonium bicarbonate is added to the mixture of furnish, peroxide compound, wax, and binding resin, prior to formation of the mat.

12. The method of claim 11 wherein the pH of the mixture of furnish, peroxide compound, wax, phenol-formaldehyde resin, and pH adjusting additive is from about 5 to about 8.

13. The method of claim 12 wherein the pH is from about 5.5 to about 7.0.

14. The method of claim 12 wherein the ammonia water contains from about 28% to about 30% $NH_3$ based on the weight of ammonia water.

15. The method of claim 1 wherein the temperature of hot pressing is from about 199° C. to about 216° C.

16. The method of claim 1 wherein the core temperature is at least 150° C.

* * * * *